(12) United States Patent
Arrigoni Neri et al.

(10) Patent No.: US 7,472,731 B2
(45) Date of Patent: Jan. 6, 2009

(54) SNOW CHAINS WITH A LIMITED BULK

(75) Inventors: Marco Arrigoni Neri, Ballabio (IT); Luigi Farina, Dolzago (IT)

(73) Assignee: Thule SpA, Molteno (LC) (IT)

( * ) Notice: Subject to any disclaimer, the term of this patent is extended or adjusted under 35 U.S.C. 154(b) by 31 days.

(21) Appl. No.: 11/485,414

(22) Filed: Jul. 13, 2006

(65) Prior Publication Data
US 2007/0034310 A1 Feb. 15, 2007

(30) Foreign Application Priority Data
Aug. 12, 2005 (EP) .................................. 05425595

(51) Int. Cl.
*B60C 27/08* (2006.01)
(52) U.S. Cl. ..................... 152/233; 152/242; 152/243; 152/231
(58) Field of Classification Search ................ 152/171, 152/172, 217, 219, 231, 232, 233, 241, 242, 152/243, 244
See application file for complete search history.

(56) References Cited

U.S. PATENT DOCUMENTS

| 1,419,043 | A |   | 6/1922  | Gray |
| 1,424,347 | A | * | 8/1922  | Evans .......................... 428/578 |
| 1,667,686 | A |   | 4/1928  | Benien et al. |
| 1,855,279 | A |   | 4/1932  | Borg |
| 2,281,655 | A |   | 5/1942  | Zippay |
| 4,240,485 | A | * | 12/1980 | Barnett et al. ................ 152/219 |
| 7,204,282 | B2 | * | 4/2007 | Scott et al. .................. 152/242 |
| 2007/0151647 | A1 | * | 7/2007 | Marco et al. ................ 152/231 |

FOREIGN PATENT DOCUMENTS

| DE | 297 19 837.8 |   | 12/1997 |
| DE | 29719837 | U1 * | 12/1997 |
| FR | 742.649 |   | 3/1933 |
| FR | 2 755 644 |   | 5/1998 |

OTHER PUBLICATIONS

European Search Report for EP 05 42 5595 dated Jan. 2, 2006.
European Search Report for EP 06 01 2502 dated Nov. 16, 2006.

* cited by examiner

*Primary Examiner*—Russell D Stormer
*Assistant Examiner*—Kip T Kotter
(74) *Attorney, Agent, or Firm*—Nixon & Vanderye, PC

(57) ABSTRACT

A snow chain (2) comprises an inner ring (3) designed to be closed on the side of the wheel destined to face toward the inside of the vehicle, an outer ring designed to be closed on the side of the wheel destined to face toward the outside of the vehicle and a series of portions of anti-skid chain (10, 10') disposed on the tread of the tyre (1) of the wheel, which join the outer ring and the inner ring (3).

The portions of chain (10, 10') are chains with twisted links, connected to each other by means of joining elements (4) shaped as triangular links and connected to the inner ring (3) by means of an U-bolt connecting system (5).

5 Claims, 5 Drawing Sheets

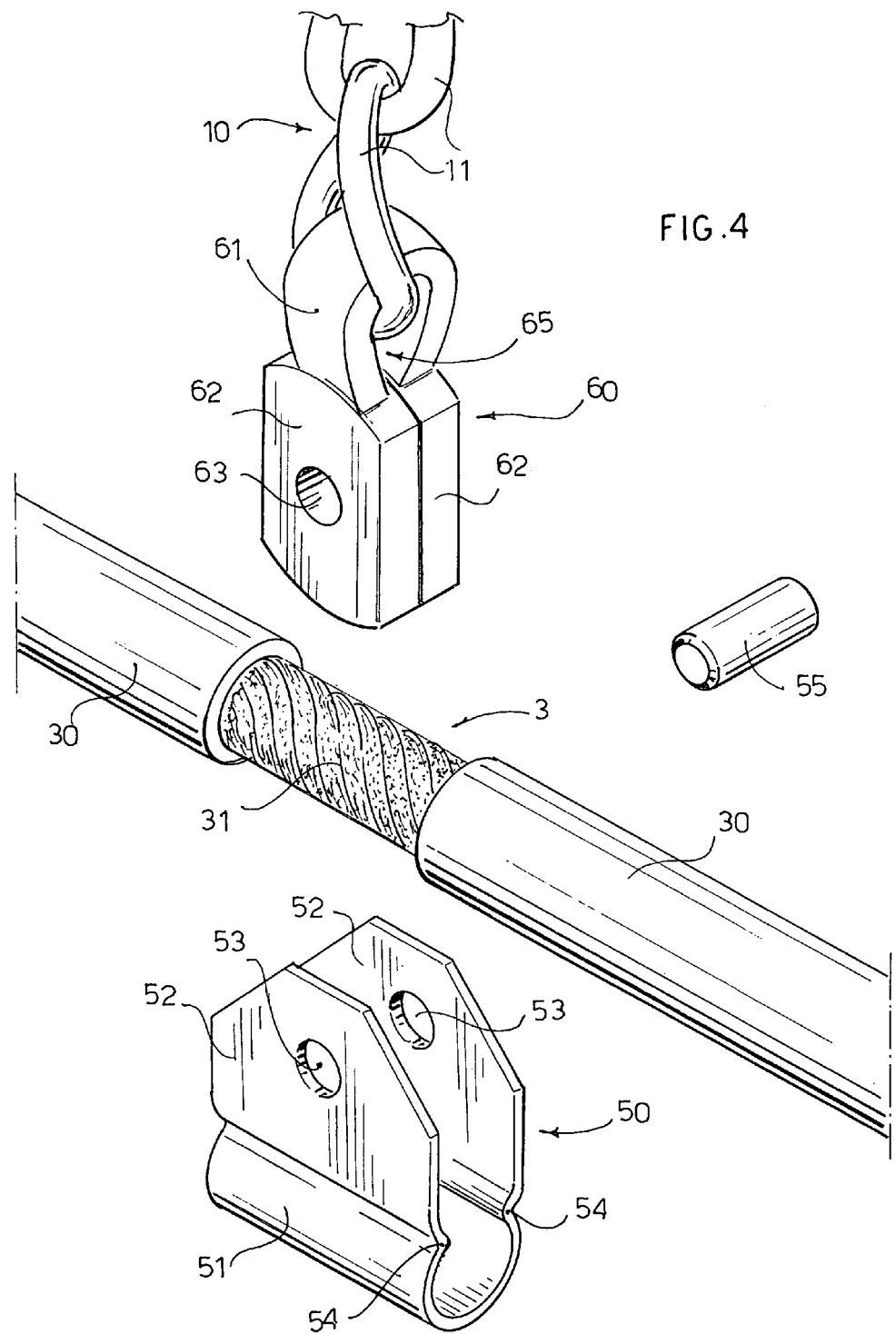

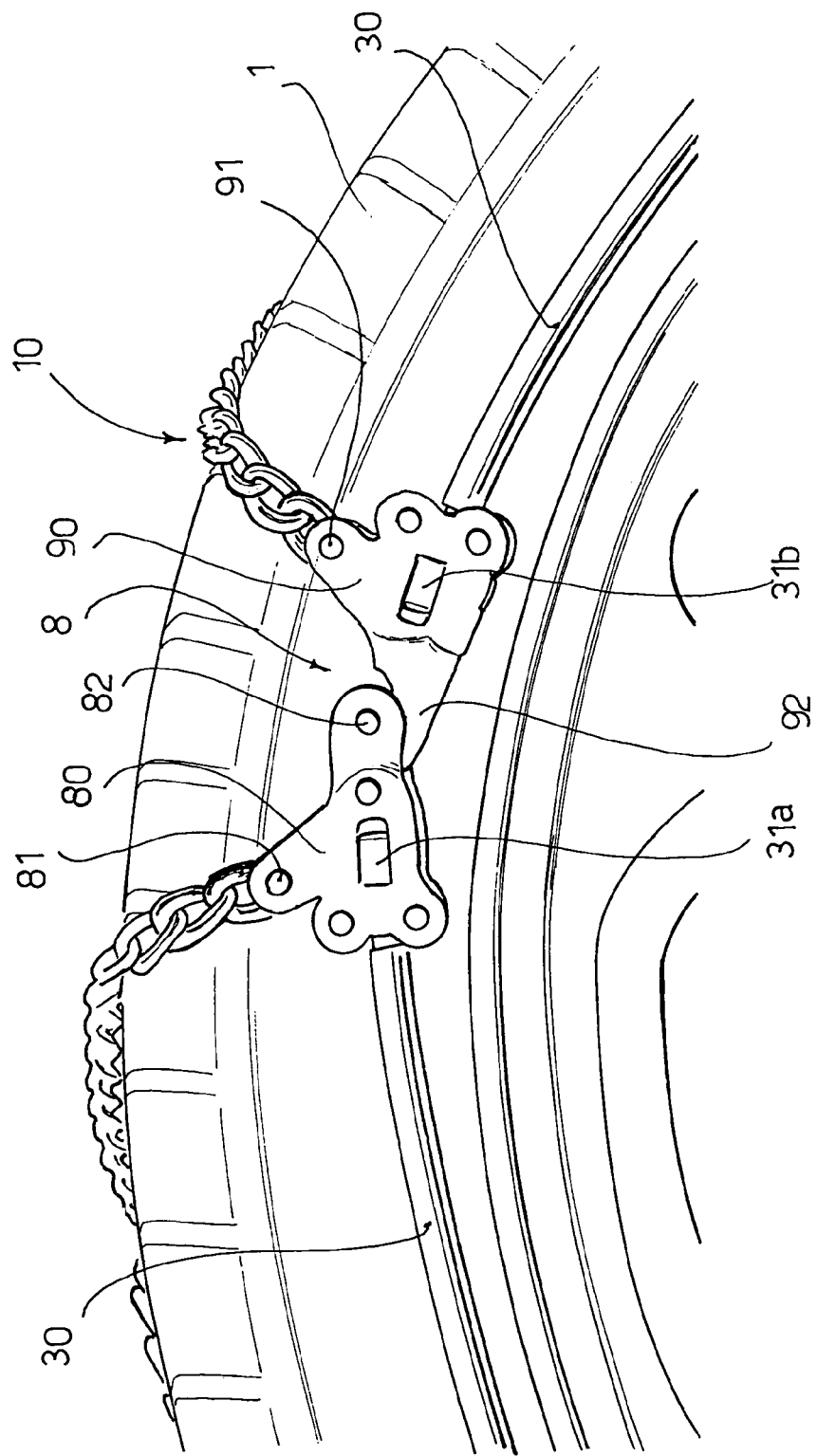

SNOW CHAINS WITH A LIMITED BULK

The present invention refers to anti-skid devices or snow chains designed to be mounted on vehicle tyres and in particular to snow chains which, when mounted, have a limited bulk.

When a vehicle travels on a road surface covered with snow, sleet or ice, its tyres do not have a good grip and dangerous side slipping or skidding of the vehicle can occur. To avoid these problems it is customary to use anti-skid devices, commonly called snow chains.

The snow chains, normally mounted on the driving wheels of the vehicle, bite into the snow and/or the ice deposited on the road surface, increasing the tread traction and allowing the vehicle tires to achieve a good grip.

As is known, a snow chain generally consists of two side members (chains, flexible cables, steel wires, ropes or the like) which, during the use, are closed in a ring on the inner side and on the outer side of the wheel, respectively, and which will be referred to herein as the inner ring and the outer ring. These side members are connected by a series of chain portions variously disposed to achieve the tread traction, the whole being completed by a tensioning device for said members, known as a tensioner.

The snow chains normally have straight links, that is each link has a substantially elliptical shape and is disposed on a plane perpendicular to that of the adjacent links.

These snow chains, besides having a considerable bulk on the tread of the tyre, involve a considerable bulk above all on the sides thereof, also because of the joining means used. This contrasts with the increasingly great needs in modern vehicles to have extremely small spaces, especially between the inner side of the tyre and the mechanical members of the vehicle.

FR 742 649, U.S. Pat. No. 1,855,279 and FR 2 755 644 disclose snow chains comprising portions of chain with twisted links and a triangular connection element connecting the end of the chain portions.

U.S. Pat. No. 1,667,686 discloses an anti-skid device of the type embodying cross or tread members and side or retaining members.

U.S. Pat. No. 2,281,655 discloses a snow chain comprising portions of chain with twisted links and a split sleeve for the connection of the chain portions to the ring of snow chain.

Object of the present invention is to overcome the drawbacks of the prior art by providing a snow chain that has a limited bulk, especially on the sides of the tyre and therefore does not interfere with the mechanical members of the vehicle.

Another object of the present invention is to provide a snow chain that is reliable and at the same time cheap and simple to produce.

Another object of the present invention is to provide a snow chain that is practical and simple to use for the user.

These objects are achieved, in accordance with the invention, with the characteristics listed in appended independent claim 1.

Preferred embodiments of the invention are apparent from the dependent claims.

The snow chain according to the invention comprises:
- an inner ring, designed to be closed on the side of the wheel destined to face toward the inside of the vehicle,
- an outer ring, designed to be closed on the side of the wheel destined to face toward the outside of the vehicle, and
- a series of portions of anti-skid chain, disposed on the tread of the tyre of the wheel, which join the outer ring and the inner ring.

The portions of chain are chains with twisted links, that is chains in which each link has undergone a twisting around its major axis. These portions of chain are connected to each other by means of joining elements shaped as triangular links and are connected to the inner ring by means of a U-bolt connecting system.

These systems for joining and for connecting the portions of chain are designed so as to allow the rotation of the portions of chain around the joining and connecting elements and at the same time to occupy the smallest space possible so as not to interfere with the mechanical members of the vehicle.

Further characteristics of the invention will be made clearer by the detailed description that follows, referring to a purely exemplary and therefore non-limiting embodiment thereof, illustrated in the appended drawings, in which:

FIG. 4 is a perspective exploded view illustrating the U-bolt connecting system of FIG. 3; and FIG. 5 is an enlarged view of a detail of FIG. 1 illustrating a closing device for closing the inner ring of the snow chains.

FIG. 1 shows a wheel of a vehicle provided with a tyre 1 on which a snow chain, denoted as a whole with the reference numeral 2, is applied as an anti-skid device.

Figure 1:
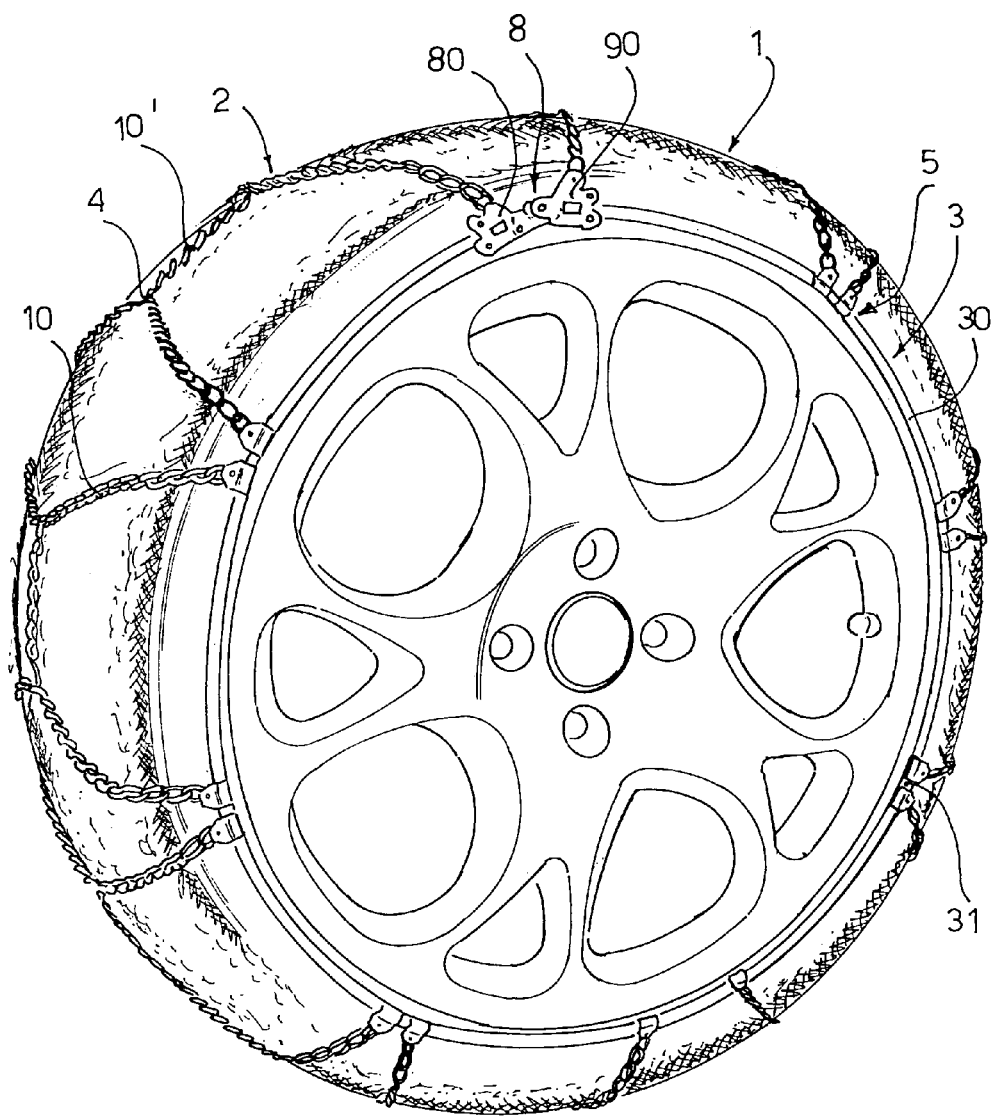
FIG. 1 is a perspective view illustrating a snow chain according to the invention, applied to a tyre of a wheel shown from the side facing towards the inside of the vehicle.

The chain 2 comprises:
- a member 3 which can be closed in a circle or in a ring on the side of the wheel destined to face towards the inside of the vehicle, henceforth called the inner ring 3, a member (not shown) which can be closed in a circle or in a ring on the side of the wheel destined to face toward the outside of the vehicle, henceforth called the outer ring, and
- a series of portions (10, 10') of anti-skid chain, variously disposed on the tread of the tyre 1 of the wheel, which join the outer ring and the inner ring 3.

Figure 2:
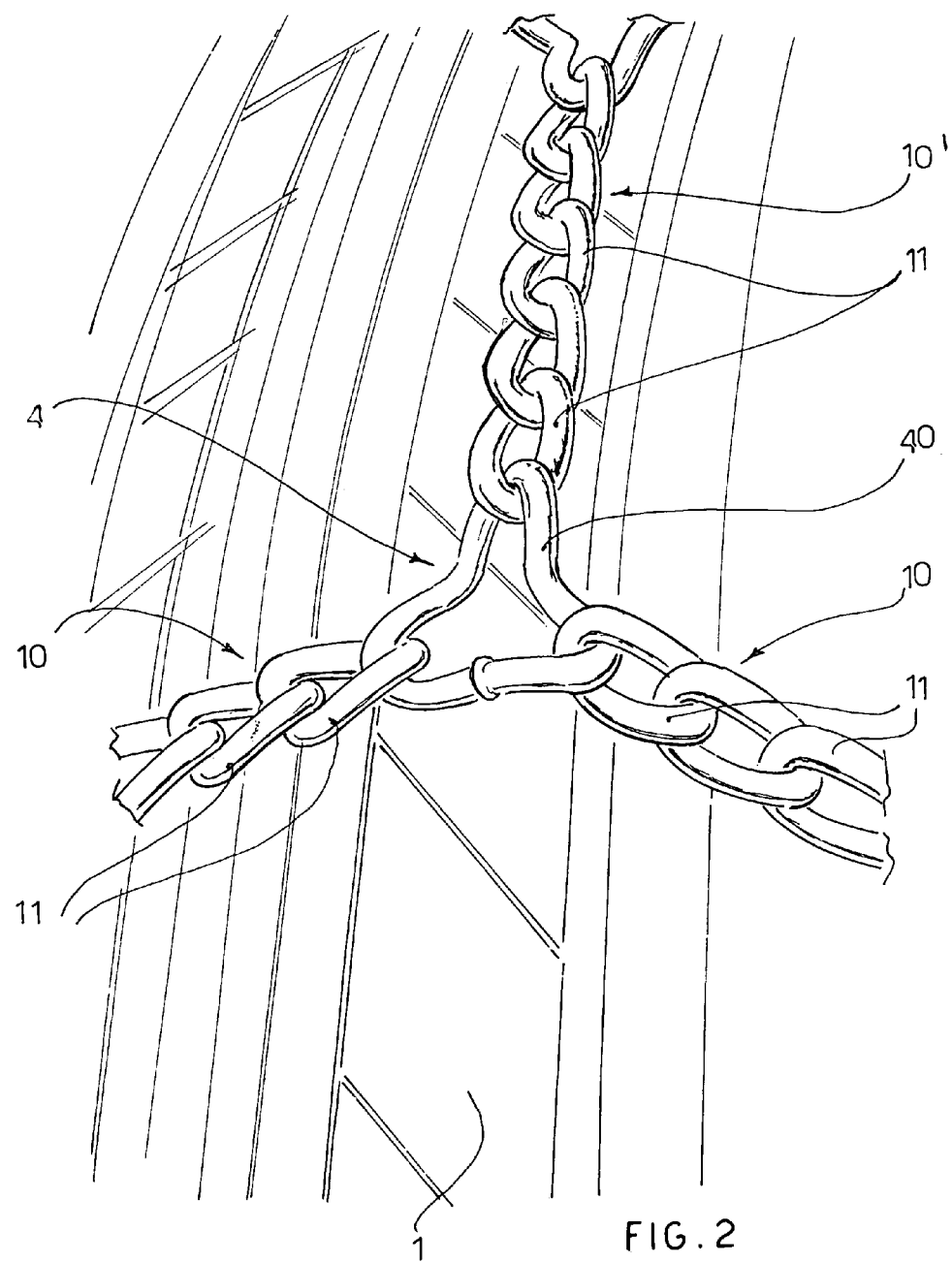
FIG. 2 is an enlarged view of a detail of the FIG. 1 illustrating a triangular joining element for joining portions of chain to each other.

As shown better in FIG. 2, the portions of chain (10, 10') consist of twisted link chains, that is to say each portion of chain comprises a plurality of twisted links 11, interlinked with one another. Each twisted link 11 consists of a substantially elliptical annular element, which is twisted around its major axis.

In this manner, each twisted link 11 has two opposite portions which abut on the tyre 1 and two opposite portions which protrude outward with respect to the tread of the tyre 1, acting as ice-breaking elements and helping to improve the friction on the tyre tread.

Returning to FIG. 1, the portions of chain 10 are preferably disposed on the tyre 1 in a diamond configuration and are connected to each other by connecting portions 10' disposed along the middle portion of the tread of the tyre 1. Consequently, a joining element 4 is used to link together the two portions of chain 10 which form the two sides of the diamond and the portion of connecting chain 10'.

As shown better in FIG. 2, the joining element 4 consists of a link of chain shaped as an equilateral triangle twisted to adapt to the twisted links 11 of the portions of chain (10, 10'). That is to say, a twisting is performed around the axes of the various sides of the triangular link 4.

In this manner the central portions 40 of the triangular link of the joining element 4 are curved towards the outside of the tyre, whilst the angular portions of the joining element 4 are curved towards the tyre 1 to receive, in an interlinked configuration, the end links 11 of the portions of chain (10, 10').

Returning to FIG. 1, the inner ring 3 comprises a core 31 consisting of an interrupted metal cable or of a plurality of twisted metal strands, covered with an interrupted plastic sheath 30. U-bolt connecting systems 5 are used to connect to the inner ring 3 the ends of the portions of chain 10 which form the diamonds.

Figure 3:
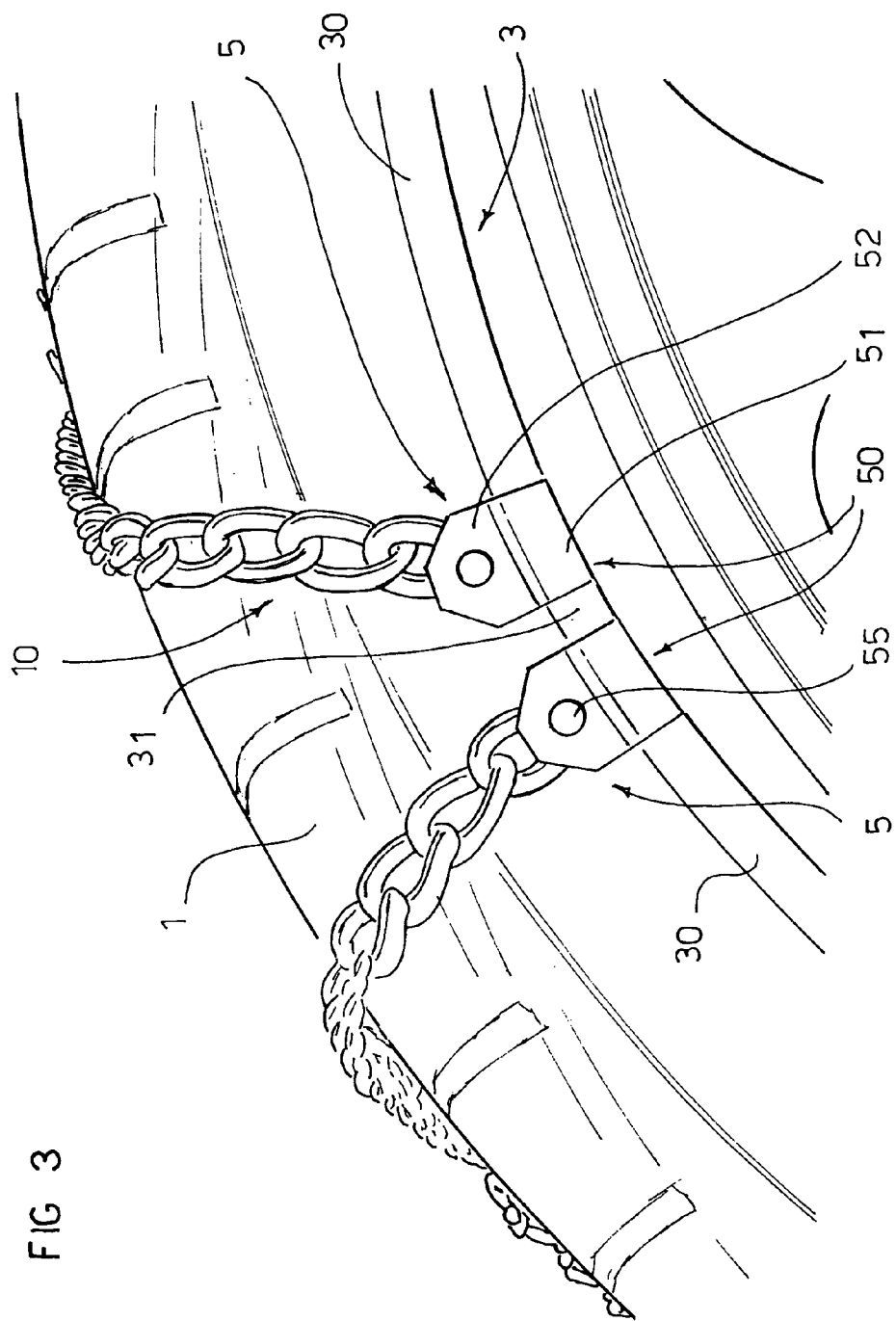
FIG. 3 is an enlarged view of a detail of FIG. 1, illustrating two U-bolt connecting systems for joining the portions of chain of the inner ring of the snow chains.

As shown better in FIGS. 3 and 4, the U-bolt connecting system 5 comprises a U-bolt element 50 destined to be mounted on the inner ring 3 and a joining element 60 destined to be connected to the end link 11 of the portion of chain 10.

The U-bolt element 50 is obtained from a metal plate bent in U-shape around the core 31 of the inner ring 3, so as to form a substantially semi-cylindrical portion 51 which surrounds the core 31 of the inner ring. In this manner the U-bolt element 50 can rotate around the core 31 of the inner ring.

The semi-cylindrical portion 51 of the U-bolt element 50 continues with two substantially pentagonal flat portions 52 which have two through holes 53 aligned in a transverse direction with respect to the axis of the semi-cylindrical portion 51. The flat portions 52 of the U-bolt element are disposed parallel to each other and spaced apart so as to leave an empty space between them.

Narrowings 54 defined by external grooves and by ribs toward the inside are provided between the semi-cylindrical portion 51 and the flat portions 52, so as to avoid the disengagement of the core 31 of the inner ring 3 from the semi-cylindrical portion 51 of the U-bolt element 50.

The joining element 60 is made from a metal plate bent in U-shape around the twisted end link 11 of the respective portion of chain 10 and having flattened, overlapping terminal edges 62. In this manner the joining element 60 has two flat overlapping edges 62 and a curved portion 61 of smaller width which defines an opening 65 through which the twisted end link 11 of the portion of chain 10 passes. The curved portion 61 of the joining element can be twisted with respect to the overlapping edges 62 so as to adapt to the shape of the twisted link 11.

A through hole 63 is formed in the overlapping edges 62 of the joining element 60. The overlapping edges 62 of the joining element 60 are disposed inside the empty space between the two flat portions 52 of the U-bolt element 50, so that the holes 53 of the flat portions of the U-bolt element are in register with the holes 63 of the joining element 60. A locking pin or pivot 55 is then inserted into the aligned holes 53 and 63 so as to hinge the joining element 60 to the U-bolt element 50 around the axis of the pin 55.

It should be noted that the U-bolt element 50 can rotate around the core 31 of the inner ring and that the joining element 60 can rotate, with respect to the U-bolt element 50, around the transverse pin 55. Furthermore the U-bolt system 5 obtained by coupling the U-bolt element 50 with the joining element 60 occupies a reduced thickness on the inner ring 3 and thus does not interfere with the mechanical members of the vehicle.

The second U-bolt element 60 can be obtained from a single parallelepiped block, having the size and the thickness of the two flat overlapping edges 62, which has a U-shaped curved portion corresponding to the curved portion 61.

Furthermore the joining element 60 can be replaced by a straight or flat chain link hooked to the twisted end link 11 and to the cross pin 55 of the U-bolt element 50.

Returning to FIG. 1, the ends of the core 31 of the inner ring 3 are constrained to two engagement elements 80 and 90 forming part of a closing device 8 of the inner ring, per se known.

As shown better in FIG. 5, each engagement element 80 and 90 of the closing device 8 consists of two half shells in the form of plates which form a seat to lock rotatably the respective ends 31a and 31b of the core 31 of the inner ring 3. Furthermore, each engagement element 80 and 90 of the closing device 8 comprises a respective pivot (81, 91) disposed inside the end link of the respective portion of chain 10. An engagement element 90 comprises a hook-shaped curved end 92 that engages in a pin 82 provided at the end of the other engagement element 80.

In this case also, the flattened shape of the two engagement elements (80, 90), each formed from two superimposed plate-shaped half-shells, helps to prevent the closing device 8 from interfering with the mechanical members of the vehicle.

The end links of the portions of chain 10 can be connected to the outer link by means of any per se known connecting system which is therefore not illustrated. In fact in this case the bulk of the connecting system is less influential.

Many changes and modifications of detail within the reach of a person skilled in the art can be made to the present embodiment of the invention without thereby departing from the scope of the invention set forth in the appended claims.

The invention claimed is:

1. A snow chain (2) comprising:
an inner ring (3), designed to be closed on the side of the wheel destined to face towards the inside of the vehicle,
an outer ring, designed to be closed on the side of the wheel destined to face toward the outside of the vehicle, and
a series of portions of anti-skid chain (10), disposed on the tread of the tyre (1) of the wheel, which join the outer ring and the inner ring (3),
said portions of chain (10), are chains with twisted links, connected to each other by means of joining elements (4) shaped as triangular links,
said portions of chain (10) being connected to said inner ring (3) by means of a U-bolt connecting system (5) comprising:
a U-bolt element (50) hinged to an end link (11) of a respective portion of chain (10), said U-bolt element comprising a plate bent in U-shape around a core (31) of said inner ring (3), so as to form a substantially semi-cylindrical portion (51) which surrounds the core (31) of the inner ring, so as to be able to rotate around said core (31), and in that said U-bolt element (5) is hinged to the end link (11) by means
of a pivot or pin (55) mounted in said U-bolt element (50) in a transverse direction with respect to the axis of said semi-cylindrical portion (51), and
of a joining element (60) mounted rotatably around said transverse pin (55) of the U-bolt element and interlinked with the twisted end link (11) of said portion of chain with twisted links (10);
wherein said joining element (60) comprises a flattened part provided with a hole (63) designed to be engaged by said pin (55) of the U-bolt element (50) and a U-shaped curved portion (61) on said flattened part to interlink said twisted end link (11) of said portion of chain with twisted links (10) with said joining element (60), and
wherein said joining element (60) is obtained from a plate bent in U-shape around the twisted end link (11) of said portion of chain with twisted links (10), and said flattened part comprises flattened edges (62) that are overlapping such that said hole (63) extends through each said flattened edge.

2. A snow chain (2) according to any one of claim 1, wherein said U-bolt element (50) comprises a semi-cylindrical portion (51) destined to be disposed rotatably around the core (31) of the inner ring (3) and two flat portions (52) parallel and spaced apart from each other so as to leave an empty space between them to receive said joining element (60).

3. A snow chain (2) according to claim 1, wherein said portions of chain with twisted links (10) are disposed in a diamond configuration on the tread of the tyre (I) and are connected by portions of connecting chains with twisted links (10') disposed along the middle portion of the tyre, the two portions of chain (10) forming two sides of the diamond and the respective portion of connecting chain (10') being connected to each other by means of said joining element (4) shaped as a triangular link.

4. A snow chain (2) according to claim 1, wherein said joining element (4) shaped as a triangular link is twisted around the axes of the respective sides to receive three respective twisted end links (11) of portions of chain (10, 10').

5. A snow chain (2) according to claim 1, wherein said inner ring (3) is closed by means of a closing device (8) comprising a first engagement element (80), constrained to one end of the inner ring and to a portion of chain (10), which engages with a second complementary engagement element (90) constrained to the other end of the inner ring and to another portion of chain, each of said engagement elements (80, 90) being obtained by means of a pair of plates coupled together.

* * * * *